May 1, 1973 L. TERZIAN 3,730,815

TAPE APPLICATOR

Filed Aug. 10, 1970 2 Sheets-Sheet 1

LEON TERZIAN
INVENTOR.

BY Allan M. Shapiro

ATTORNEY

TAPE APPLICATOR
Filed Aug. 10, 1970 2 Sheets-Sheet 2
FIG. 5, FIG. 6
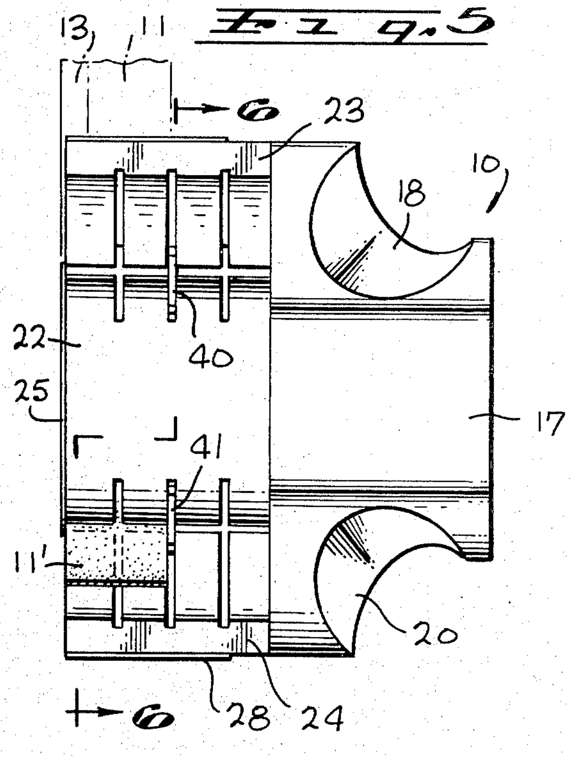
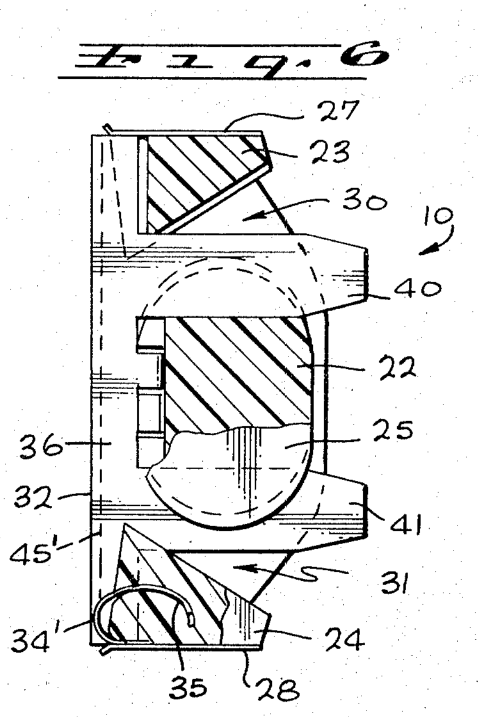
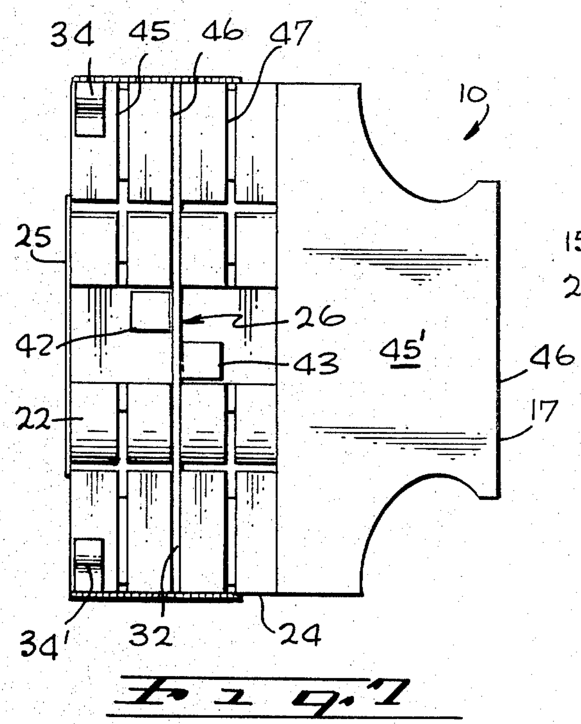
FIG. 7
FIG. 8
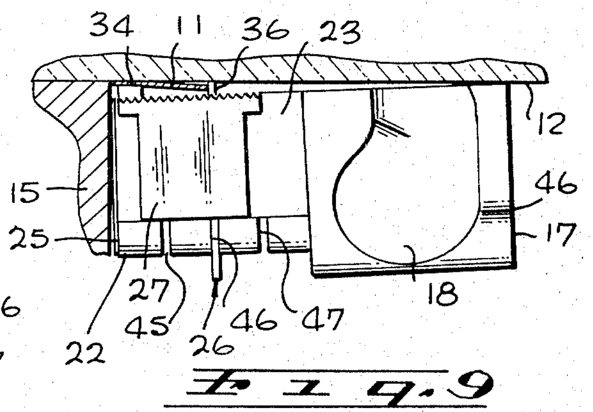
FIG. 9
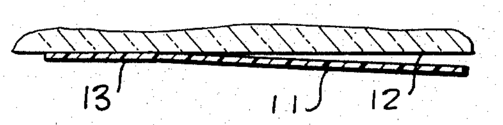
INVENTOR.
LEON TERZIAN
BY Allan M. Shapiro
ATTORNEY United States Patent Office 3,730,815

Patented May 1, 1973

3,730,815

TAPE APPLICATOR

Leon Terzian, 8448 Samra Drive, Canoga Park, Calif. 91304

Filed Aug. 10, 1970, Ser. No. 62,303
Int. Cl. B32b *31/18; 31/20*
U.S. Cl. 156—527 10 Claims

ABSTRACT OF THE DISCLOSURE

An applicator for installing a pressure sensitive tape onto a work surface is disclosed herein having a body which includes a finger holding portion and a tape tensioning and applying portion that is laterally carried on the finger holding portion. The applying portion includes an oval, in cross-section, member which is disposed in fixed spaced relationship between a pair of retainers laterally carried on the ends of the finger holding portion so as to define a pair of side opening slots for conducting a portion of tape therethrough. Resiliently biased pressure means are carried by the retainer and serve to press against the tape as the applicator is moved along the work surface. Means are provided accommodating a variety of tape widths as well as for severing applied tape from its storage roll.

BACKGROUND OF THE INVENTION

(1) Field of the invention

This invention relates generally to the field of tape applicators and more particularly, to a novel tape applicator for use in applying masking tapes or building tapes to a work surface for use in areas of restricted space and for use in the application of tapes to working surfaces not characteristic of prior art applicators.

(2) Description of the prior art

In the application of building tapes or masking tapes, the prior art discloses a wide variety of tape dispensers and applicators such as those disclosed in U.S. Letters Patent Nos. 3,318,753; 3,132,783; 3,364,096 and 2,868,-402. Many of these applicators, having the tape feed and guide rollers in a container and a cutting device attached thereto, cannot be used to apply tape continuously. Instead, these prior art applicators require interrupting operation during the measurement of the length of tape needed to complete the application of tape along a given working surface. The prior applicators are not capable of being guided along a straight edge so that a precisely straight line of tape can be drawn.

In using the prior dispensers or applicators to apply pressure sensitive tape along a straight or curved path, it is sometimes necessary to cut a length of tape sufficient to complete the path and then use both hands in applying the tape. When tape is applied in a curved path, application by hand is not effective in producing adherence to the working surface. Although one applicator or dispenser in the prior art can be used to apply tape along a curvilinear path, it has the serious limitation of applying the tape under undue tension, thereby causing it to creep from the curved path. Furthermore, applicators in the prior art disclose devices which cause adherence of the adhesive surface of the tape to be applied over its entire adherence area. Therefore, in the event a larger masking pattern or material, such as a newspaper, is required to be held by the tape, it is necessary to strip or unseal a portion of the tape from the working surface so that the larger masking material may be inserted therebeneath.

Other examples of defects in prior art applicators and dispensers, which the present invention corrects, are difficulty in holding the applicator and applying tape directly from the supply roll and difficulty in loading, assembly and threading tape onto the applicator as well as applying the tape to restricted areas such as corners and in close adherence to right-angled structures.

SUMMARY OF THE INVENTION

Accordingly, difficulties and problems encountered with prior art pressure sensitive tape applicators are obviated by the present invention. Initially, it will be noted that the device is a tape applicator and not a dispenser for tape. The present invention is designed for the special purpose of applying masking tape along the edge of a surface adjoining a second surface which is to be painted, for example. The conventional manual method of tape application, as described above, is extremely difficult and time consuming and does not result in a straight edge. The inventive device overcomes these problems and the device is bilateral in that its design is symmetrical for use with left and right edges and/or in either direction.

In one embodiment of the invention, a base or body is provided having a finger holding section or portion which is grooved so as to accommodate the thumb and index finger of the user. The undersurface of the finger holding portion includes an outer edge which rides upon the working surface as the applicator is moved along. Laterally carried by the finger holding portion, is a tape applying portion which comprises an oval member having rounded end surfaces and which is disposed between a pair of retainers so as to define a slot or passageway for accommodating conduction of the tape therethrough. Means are provided for resiliently pressing against a selected edge of the tape so that the tape is partially pressed into contact with the working surface. In this connection, means are also provided for lifting a portion of the undersurface of the applicator from the working surface so that the undersurface of the applicator is angularly disposed with respect to the working surface and so that the only portion of the undersurface contacting the working surface is the latter mentioned outer edge of the finger holding portion. Such means may include an insert which serves as an adjustable lateral guide member so that different widths of tape can be accommodated. Means may also be provided at the opposite ends of the applicator for severing a selected length of tape after it has been applied to the working surface.

Therefore, it is the primary object of the present invention to provide a novel pressure sensitive tape applicator that will readily accommodate a variety of tape widths and which may be bilateral in that it is symmetrical for use in left and right edges and/or in either direction.

Another object of the present invention is to provide a novel pressure sensitive tape applicator in which a portion of the tape to be applied to the working surface may be readily threaded through open slots into position on the applicator and whereby the applicator may be slidably moved along the working surface whereby an edge marginal region of the tape is pressed into securement with the working surface so that its opposite edge marginal region is free from adhesion.

Still another object of the present invention is to provide a novel tape applicator for applying masking or other pressure sensitive tape onto a working surface whereby the applied tape is partially secured to the working surface so that other larger masking materials may be slipped under the non-adhered portion of the tape and secured to the working surface thereby.

It is also a primary object of the present invention to provide a novel improved tape applicator including means by which the width of the tape applied may be conveniently varied without requiring a change in the width of the tape enclosed within the device.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 4 is an exploded perspective view of the underside of the tape applicator illustrating width margin segments preparatory for installation on the applicator;

FIG. 5 is an enlarged top plan view of the tape applicator;

FIG. 6 is a transverse cross-sectional view of the tape applicator shown in FIG. 5 as taken in the direction of arrows 6—6 thereof;

FIG. 7 is a bottom plan view of the tape applicator;

FIG. 8 is an end elevational view of the tape applicator in use as shown in FIGS. 1 and 5;

DESCRIPTION OF THE PREFERRED EMBODIMENT

Figures 1, 9:
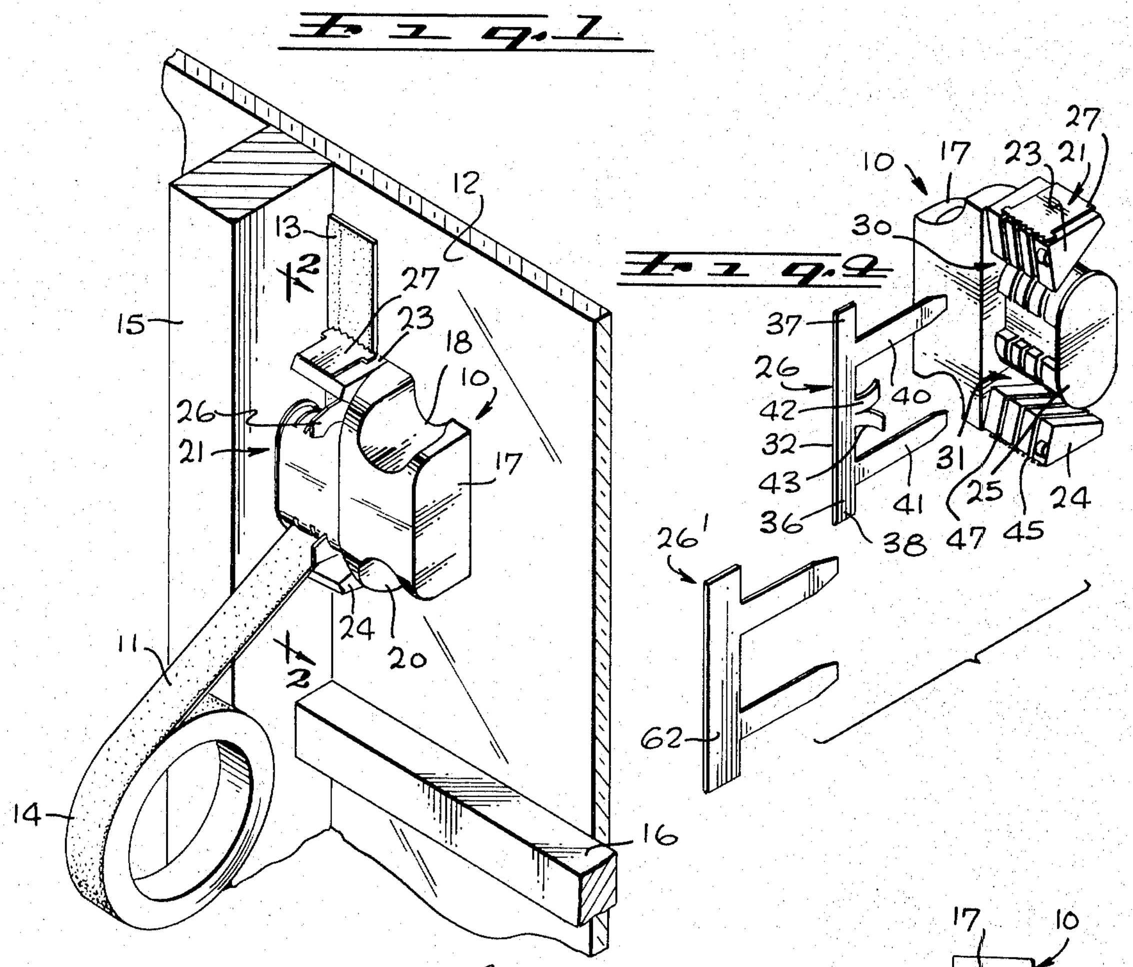
FIG. 1 is a perspective view of the tape applicator incorporating the present invention and illustrating the applicator in a typical position for adhering tape to a window surface.
FIG. 9 is a greatly enlarged cross-sectional view of the sloping undersurface of the tape applicator and a portion of pressure sensitive tape.

Referring to FIG. 1, the novel tape applicator of the present invention is indicated in the general direction of arrow 10 and is illustrated in connection with applying a length of tape 11 onto a working surface 12. The applicator is a manually operable applicator for applying the tape 11 and through the manual transport of the applicator 10 along the surface 12 to be masked, the applicator presses a portion of the strip of tape, as indicated by numeral 13, as it is unwound from a roll 14 into adhered relation with such surface.

Masking tape is usually in the form of strip of kraft paper provided upon one surface with presure sensitive adhesive and is commercially available in roll form in varying widths, for example half-inch, three-quarter-inch and one-inch, the tape being wound upon a cylindrical tubular core usually of heavy cardboard having a standard inside diameter, for example three inches. Such a roll is indicated by numeral 14 and it can be seen that a terminating length of the tape carried by the roll is passed through the applicator 10 and its extreme terminating end is partially secured to the working surface 12. The device is primarily intended for the application of masking tape to the working surface 12 to be protected and which is disposed adjacent and usually at right angles to the surface to be painted, for example, the adjacent surfaces of a ceiling and wall, a door and a wall or window frame, a glass window pane and a window frame or mullion strip, a wall and a baseboard, etc. In the masking and painting of such surfaces, it is desired that the masking tape be adequately applied to the surface to be masked in a straight line and with an edge in substantially abutting relation to the surface to be painted. Accordingly, the surface 12 may be that of a window pane and its adjacent structure may be a window frame indicated by numeral 15. Also, a brace 16 lies against the surface 12 and is in abutting relationship with respect to the frame 15 so that a corner is provided for illustrative purposes in demonstrating the utility of the applicator.

Referring in detail to FIG. 1, it can be seen that the applicator 10 includes a finger holding portion 17 which is formed at its opposite end with receptacles 18 and 20 for receiving the index finger and thumb of the user respectively. Disposed laterally with respect to the finger holding portion, there is provided an applicator portion 21 which includes a central member, oval in cross-section, indicated by numeral 22, which is disposed in fixed space relationship with respect to a pair of end retainers 23 and 24 so that a slot or passageway is defined between the opposing surfaces of retainer 24 and one end of central member 22 and equally defined between the other opposing surfaces of retainer 23 and the opposite end of central member 22. The tape is guided through the slot or passageway by means of a side guide plate 25 and an insert 26, to be described later. The opposite ends of the applicator portion 21 are provided with serrated cutting edges carried on plates 27 and 28 whereby the applied or secured tape may be readily severed from the unsecured portion of tape carried by the applicator.

Figures 2, 3:
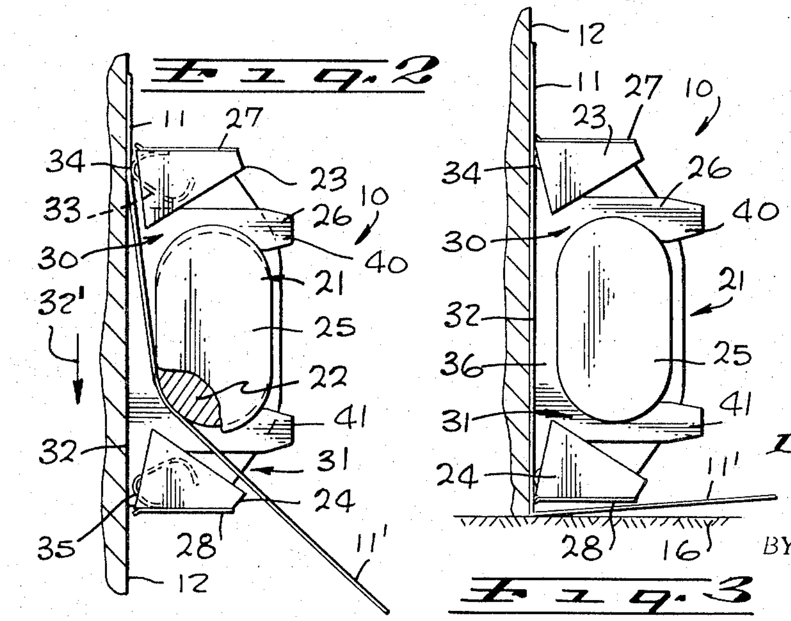
FIG. 2 is a side elevational view of the tape applicator taken in the direction of arrows 2—2 of FIG. 1.
FIG. 3 is a view similar to the view of FIG. 2 showing the applicator in position for installing tape in a corner.

Referring now to FIG. 2, it can be seen that the unsecured portion of the tape is indicated by numeral 11' while the secured portion of tape is indicated by numeral 11. The pair of passageways, indicated by numerals 30 and 31 are selectively employed to conduct a portion of the tape 11' therethrough. For example, when the applicator is to be moved in the direction of arrow 32', the unsecured portion 11' of the tape will be conducted through passageway 31 between the rounded surface of central member 22 and the opposing surface of end retainer 24. However, if the tape is to be applied in the other direction, then the unsecured portion of the tape will be conducted through passageway 30. It can also be seen in FIG. 2 that the side guide plate 25 includes an edge marginal region which extends beyond the periphery of the dimensions of the central member 22 so that the adjacent edge of the tape will ride against the inside surface of the plate. In a similar fashion, it can be seen that the other edge of the tape will be guided by the opposing surface of retainer 26 which includes a linear edge 32 adapted to move in sliding relationship on the surface 12.

An important feature of the present invention includes the provision that each of the end retainers 23 and 24 include a means for pressuring a portion of the tape into securement with the surface 12. In one form, such means may be a leaf spring 33 carried by retainer 23 which includes a rounded portion 34 projecting beneath the retainer in slidable engagement with the non-adhesive or top surface of the tape 11. A similar leaf spring indicated by numeral 35 is carried by end retainer 24. It is to be particularly noted that the nub portion 34 of the spring 33 does not ride across the entire width of the tape but only engages an edge marginal region of the tape as indicated by numeral 13 in FIG. 1. Therefore, only this edge marginal region is in securement with the surface 12.

Referring now to FIG. 3 in detail, it can be seen that since the passageways 30 and 31 are laterally open, the tape may be readily disengaged from the applicator and the applicator positioned on top of the tape so that either of its serrated cutting edges carried by plates 27 or 28 may be placed in position over the applied tape for severing the unadhered portion therefrom. Such an arrangement works well in corners where the serrated edge carried by plate 28 may be placed in close proximity to the corner and the unsecured portion 11' of the tape may be pressured across the serrated edge for severing the tape therefrom.

Referring now to FIG. 4, it can be seen that the retainer 26 includes a base portion 36 having end tabs 37 and 38 on opposite ends of the base and which further includes outwardly projecting legs 40 and 41, respectively, which are tapered at their free ends. The retainer 26 may be readily inserted into aligned slots provided in the retainer 23 and 24 as well as in the central member 22. The legs 40 and 41 may be retained within the respective slots by an interference fit, or, as shown in an alternate embodiment indicated by numeral 26', a pair of spring clips or clasps 42 and 43 may be employed for releasable engagement with receptacle portions of the central member 22. As can be seen from the underside of the device 10, a plurality of aligned slots are provided to accommodate the various widths of masking tape. The width of the tape intended to be secured to surface 12 will determine the slots into which the insert 26 or 26' may be inserted. For example, one edge of the tape will always reside against the inside surface of the plate 25 and its opposite edge will reside adjacent the aligned slot indicated by numerals 45, 46 and 47 depending upon its width.

Referring now in detail to FIGS. 5 and 6, it can be seen that the passages 30 and 31 are defined by the opposing surfaces of the respective retainer ends 23 and 24 and the opposite ends of the oval central member 22. Also, it can be seen that the undersurface of the device 10, as indicated in broken lines by the numeral 45', is not coextensive or coplanar with the edge 32 of the insert 26. This arrangement provides that the edge 32 will ride on the surface 12 while the undersurface 45' will be elevated from the surface 12 except for extreme edge 46 as shown in FIGS. 7 and 8. Likewise, the undersurfaces of the central portion 22 and the retainer ends 23 and 24 are also elevated or non-coplanar with the undersurface 45'. As seen in FIG. 7, the undersurface 45' resides on the finger holding portion 17. It can also be seen that the tape engaging nub portions 34 and 34' project into the cavity defined between the edge 32 of the insert and the undersurface of the respective retainer ends 23 and 24. This cavity is more clearly shown in FIG. 8 and it can be seen that the width of the cavity is the width of tape 11 and that the applied pressure from the resilient leaf spring 34 is directed along the edge marginal region of the tape 11.

As shown in FIG. 9, the numeral 13 indicates the pressed portion of tape 11 which is in securement with the surface 12 while the unsecured or unadhered portion of tape 11 is free for lifting or folding back slightly so as to receive insertion of a larger masking paper or material. Once the edge of the larger masking material has been inserted, the tape 11 may then be pressed down so that it adheres to the edge of such material and retains the material in position.

In view of the foregoing, it is to be particularly understood that the device of the present invention is an applicator for applying tape to surface 12 and is not to be considered a dispenser wherein the tape is to be stored on the device. In particular, the device 10 may be employed for the special purpose of applying masking tape along the edge of a surface adjoining a second surface which is is to be painted. This device satisfies the need for applying masking tape to the edge of a window preparatory to painting the window frame. The conventional manual method of tape application is extremely difficult and time consuming and does not result in a straight edge. Due to crinkling or buckling of the tape during its non-linear application and unevenness of finger pressure during the manual procedure for sealing purposes, paint is permitted to flow under the crinkles and folds in the tape. This inconvenience is avoided by the present invention. In use, the end of the tape 11 is inserted into the device via a selected one of the laterally opened side passageways 30 or 31 and the extreme end of the tape is placed on the window 12. Then, holding the device with fingers in recesses 18 and 20 in one hand and holding the tape roll 14 with the other hand, the undersurface 45' of the device is pressed against the window, the side guide plate 25 is pressed firmly against the window frame 15, and the device is manually slid as in the direction of arrow 32', to automatically guide and secure the tape onto the window. Tape 11 is simultaneously fed from roll 14 as by pulling the roll 14 away from the device in an unrolling manner. Note that the adhesive surface of the tape is applied against the window only and does not contact the device. A selected one of the resilient tabs or spring nubs 34 or 34' presses against the edge of the tape to seal it against the window as indicated by numeral 13 in FIGS. 1 and 9 so that the remainder of the tape can be slightly lifted away from the window for insertion of a newspaper or other wider masking material, if desired. It is to be understood that the edge 46, edge 32 and the spring portion 34 are the only ones that actually contact the window and tape. The insert 26 is an adjustable lateral guide member so that different widths of tape can be accommodated. The tape is laterally actuated and confined between side 25 and insert 40.

Figure 10:
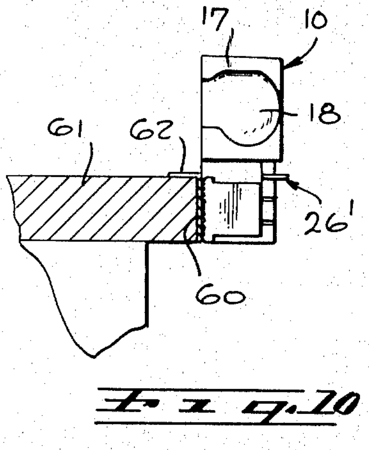
FIG. 10 is a reduced end elevational view of the tape applicator shown in usage for applying tape to the edge of a workpiece.

With respect to FIG. 10, the application device 10 is employed for securing a pressure sensitive tape 60 to the exposed edge of a frame structure 61. In this instance, a base portion 62 of the insert 26' is employed as a lateral guide which is carried in sliding relationship with respect to the side of frame 61. This embodiment differs from the embodiment of FIG. 8 in that the bottom edge 32 of the insert does not engage the work surface 12.

In further actual use of the invention, it is to be noted, particularly in FIG. 8, that the exposed or exterior surface of side member 25 will partially abut in sliding relationship with respect to the frame 15. The planar surface of the side member 25 is slightly angular with respect to the adjacent and opposing surface of frame 15 because of the cantered disposition of surface 45' with respect to the window surface 12. Preferably, the exposed surface of the side member 25 is slick, such as when the member is composed of plastic, so as to provide a smooth and unretarded sliding relationship with the opposing surface of frame 15. Similarly, by angling the opposing surface of each of the retainer blocks 23 and 24 with respect to the opposing rounded surfaces of the sectional member 22, the tape carried or conducted through the passageways 30 and 31 will be relatively unobstructed. Also, antifriction surfaces may be placed on the ends of the retainer blocks 23 and 24 which will also be in sliding relationhip with the opposing surface of frame 15. Proper guide 26 or 26' may be installed for a selected width of tape whereby the tape may be laid down immediately adjacent to the right-angled edge of surface 12 with the surface of frame 15, as shown in FIG. 1. The edge of the tape adjacent the frame 15 is pressed into engagement with the surface 12 by the resilient pressure means 33 and the edge marginal region secured to the surface 12, as indicated by number 13. The remaining portion of the tape is unsecured and may be lifted about a fold line separating the secured from the unsecured portion of the tape so that a larger piece of masking material may be inserted underneath.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A pressure sensitive tape applicator comprising:

a unitary body having a finger holding portion and a tape applying portion formed thereon and immovably secured with respect to each other;

said tape applying portion having a fixed central member laterally projecting from said finger holding portion;

a first fixed block laterally carried on one end of said finger holding portion in fixed spaced relationship with respect to said central member so as to define a tape conducting passageway for directing the tape from the top side of the body to its underside; and a second fixed block carried on said body away from said first block, said second block having a free end, and having a tape retainer spaced from said free end a distance equal to the tape width so tape is guided with its edge even with the free end of said retainer block, at least one resiliently biased pressure means carried on said second block and operably engaged in slidable relationship with the tape for pressing a portion of the tape into securement with a work surface.

2. The invention as defined in claim 1 wherein each of said first and second blocks is a retainer block, one of said blocks being laterally carried on each end of said body, said central member being disposed between said blocks so that the opposing surfaces of said blocks with respect to opposite surfaces of said central member define a pair of tape conducting passageways leading from the top side of said body to its underside.

3. The invention as defined in claim 2 wherein each of said retainer blocks is provided with a resilient biased pressure means for being slidably engageable with an edge marginal portion of the tape and with a tape retainer for edge engagement and guiding of the tape.

4. A pressure sensitive tape applicator comprising:
a body having a finger holding portion and a tape applying portion;
said tape applying portion having a central member laterally projecting from said finger holding portion;
first and second retainer blocks laterally carried on said finger holding portion at each end of said body, said central member being disposed between said retainer blocks so that the opposing surfaces of said blocks with respect to opposite surfaces of said central member define a pair of tape conducting passageways leading from the top side of said body to its underside; and
a resiliently biased pressure means carried on each of said retainer blocks so that a selected one of said resiliently biased pressure means is slidably engageable with an edge marginal portion of the tape, each of said pressure means comprising a leaf spring carried by each of said blocks and having a downwardly exposed spring portion arranged in selected sliding relationship to the tape.

5. A pressure sensitive tape applicator comprising:
a body having a finger holding portion and a tape applying portion;
said tape applying portion having a central member laterally projecting from said finger holding portion;
first and second retainer blocks laterally carried on said finger holding portion in spaced relationship on opposite sides of said central member so that opposing surfaces of said blocks with respect to opposite surfaces of said central member define a pair of tape conducting passageways leading from the top side of said body to its underside;
means carried on said tape applying portion for laterally guiding the tape through said passageways, said lateral guiding means comprising a side plate carried on the extreme free end of said central member and having an edge marginal region extending beyond the edge of said central member so as to guide one edge of the tape, and an insert removably carried in an aligned series of slots formed in said blocks and said central member so as to project a base having an elongated edge beneath said body underside.

6. The invention as defined in claim 5
wherein said base edge and the extreme edge of said finger holding portion defined by the end and undersurface thereof slidably engages a work surface so that said underside is angularly disposed with respect to said work surface.

7. The invention as defined in claim 1
including means carried on said tape applying portion for laterally guiding the tape and said guide means angularly elevating said body underside with respect to said work surface.

8. The invention as defined in claim 7
including a serrated edge carried by said second block for severing an unsecured portion of the tape from the secured portion of the tape.

9. The invention as defined in claim 8
wherein said central member is oval in cross-section and the undersides of said blocks and said central member lie in a different plane than the plane in which said body underside lies.

10. A pressure sensitive tape applicator comprising:
a unitary body having a finger holding portion and a tape applying portion formed thereon;
said tape applying portion having a fixed central member laterally projecting from said finger holding portion;
a first fixed retainer block laterally carried on said finger holding portion and having a free end, tape lateral guide means on said central member, said lateral guide means on said central member comprising a side plate carried on the free end of said central member and having an edge marginal region extending beyond the edge of said central member to guide one edge of the tape and restrain the tape to not extend beyond the edge of said central member, said lateral tape guide means further comprising a tape retainer positioned adjacent said fixed block and positioned from said free end of said fixed block a distance substantially equal to the tape width to guide the tape substantially even with said free end of said fixed block so that tape can be applied edgewise against an abutment.

References Cited

UNITED STATES PATENTS

| | | | |
|---|---|---|---|
| 3,582,438 | 6/1971 | Harbour | 156—523 |
| 3,186,892 | 6/1965 | Walthers | 156—523 |
| 3,187,968 | 6/1965 | Favre | 225—56 |
| 3,310,452 | 3/1967 | Hartley et al. | 156—523 |
| 3,390,041 | 6/1968 | Auld et al. | 156—577 X |
| 3,567,557 | 3/1971 | Kingery et al. | 156—523 |
| 3,575,771 | 4/1971 | Padgett | 156—523 |
| 3,624,235 | 11/1971 | Kleid | 156—523 X |
| 3,625,798 | 12/1971 | Ihli | 156—523 |
| 3,625,799 | 12/1971 | Way | 156—523 |
| 3,645,831 | 2/1972 | Thaeler | 156—523 X |
| 3,658,628 | 4/1972 | Zenter | 156—527 |
| 3,677,865 | 7/1972 | Wagner | 156—526 X |

HAROLD ANSHER, Primary Examiner

U.S. Cl. X.R.

156—577, 579